(12) United States Patent
Miller

(10) Patent No.: US 7,655,719 B2
(45) Date of Patent: Feb. 2, 2010

(54) THERMALLY CONDUCTIVE POLYMER COMPOSITIONS HAVING MODERATE TENSILE AND FLEXURAL PROPERTIES

(75) Inventor: James D. Miller, Marietta, GA (US)

(73) Assignee: Cool Options, Inc., Warwick, RI (US)

( * ) Notice: Subject to any disclaimer, the term of this patent is extended or adjusted under 35 U.S.C. 154(b) by 551 days.

(21) Appl. No.: 11/172,339

(22) Filed: Jun. 30, 2005

(65) Prior Publication Data

US 2006/0014888 A1 Jan. 19, 2006

Related U.S. Application Data

(60) Provisional application No. 60/587,562, filed on Jul. 13, 2004.

(51) Int. Cl.
| | |
|---|---|
| C08G 18/42 | (2006.01) |
| C08G 18/08 | (2006.01) |
| C09B 67/00 | (2006.01) |
| C08L 53/00 | (2006.01) |
| C08L 83/00 | (2006.01) |
| C09J 7/02 | (2006.01) |

(52) U.S. Cl. .............. 524/500; 524/502; 524/505; 524/507; 524/508; 524/513; 524/515; 524/519

(58) Field of Classification Search .......... 524/500, 524/502, 505, 507, 508, 513, 515, 519
See application file for complete search history.

(56) References Cited

U.S. PATENT DOCUMENTS

| | | | | |
|---|---|---|---|---|
| 4,301,060 | A | 11/1981 | Underwood et al. | 260/42.49 |
| 4,722,952 | A | 2/1988 | Hatt | 523/216 |
| 4,824,878 | A | 4/1989 | Sterzel | 523/307 |
| 4,954,309 | A | 9/1990 | McGlothlin et al. | 264/307 |
| 5,232,970 | A | 8/1993 | Solc | 524/404 |
| 5,651,922 | A | 7/1997 | Nahass et al. | 252/511 |
| 5,837,340 | A | 11/1998 | Law et al. | 428/36.8 |
| 5,930,459 | A | 7/1999 | Eckman et al. | 392/503 |
| 6,162,849 | A | 12/2000 | Zhuo et al. | 524/404 |
| 6,165,612 | A | 12/2000 | Misra | 428/344 |
| 6,337,470 | B1 | 1/2002 | Von Arx et al. | 219/544 |
| 6,372,836 | B1 | 4/2002 | Johnson | 524/439 |
| 6,392,208 | B1 | 5/2002 | Arx | 219/544 |
| 6,415,104 | B1 | 7/2002 | Fitts et al. | 392/503 |
| 6,586,533 | B1 | 7/2003 | Landi et al. | 525/315 |
| 6,611,660 | B1 | 8/2003 | Sagal | 392/497 |
| 6,659,898 | B2 * | 12/2003 | Morikoshi et al. | 474/237 |
| 6,783,692 | B2 | 8/2004 | Bhagwagar | 252/70 |
| 2002/0111415 | A1 | 8/2002 | Mack, Sr. et al. | 524/496 |
| 2003/0013798 | A1 | 1/2003 | Iino et al. | 524/495 |
| 2004/0194839 | A1 | 10/2004 | Hickman et al. | 138/149 |

* cited by examiner

*Primary Examiner*—Nathan M Nutter
(74) *Attorney, Agent, or Firm*—Barlow, Josephs & Holmes, Ltd.

(57) ABSTRACT

A thermally conductive polymer composition having enhanced mechanical properties is provided. The polymer composition consists of a base polymer matrix loaded with fillers that results in a thermal conductivity that is greater than 1.5 W/m° K and a tensile modulus within an acceptable range making the composition suitable for structural plastic applications, such as between 1,700 to 12,000 Mpa and more preferably between approximately 2,700 to 10,000 Mpa and even more preferably in the range of between approximately 4,000 to 9,000 Mpa. In addition to a tensile modulus within the identified range the composition also includes an elongation to break value that is at least above 1.0% and more preferably in the range of about 1.2% to 10%.

7 Claims, No Drawings

THERMALLY CONDUCTIVE POLYMER COMPOSITIONS HAVING MODERATE TENSILE AND FLEXURAL PROPERTIES

CROSS-REFERENCE TO RELATED APPLICATIONS

This application is related to and claims priority from earlier filed U.S. Provisional Patent Application No. 60/587,562, filed Jul. 13, 2004.

BACKGROUND OF THE INVENTION

The present invention relates generally to thermally conductive polymer compositions. More specifically, the present invention relates to thermally conductive polymer compositions that are highly thermally conductive yet have tensile and flexural properties that are not too brittle for use in common structural plastics applications.

In general, thermally conductive polymer compositions are well known in the prior art. Such compositions are typically formed by loading a variety of thermally conductive fillers including metals, ceramics or carbon into a base polymer matrix, wherein the fillers impart thermal conductivity properties to the overall composition. However, in order to produce a composition that has relatively high thermal conductivity values, a high percentage by volume of filler material must be loaded into the base polymer matrix. While a highly filled composition is typically not problematic in most applications wherein a thermally conductive polymer is utilized, there are applications wherein such highly filled compositions cannot be used. In certain applications, the difficulty arises from the fact that there is generally a very large differential between the tensile modulus of the base polymer resin and the tensile modulus of the filer material that is loaded into the polymer. For example, the difference in tensile modulus (stiffness) between metallic fillers and a typical base polymer resin is on the order of 30 times, while with ceramics the difference can be between 30-100 times and with carbon the difference can be as much as 100-500 times. The introduction of these fillers into the polymer matrix therefore results in a drastic increase in the stiffness of the overall composition. Thus, while higher filler loadings produce a desirable increase in the thermal conductivity of the composition, high filler loadings also tend to greatly increase the resultant tensile modulus of the composition resulting in a finished composition that is quite stiff. This is true regardless of the physical form of the filler (e.g. fiber, particle, sphere, etc.) and regardless of whether the filler is a continuous or discontinuous phase in the finished composite Further, while the addition of filler to the polymer directly impacts upon the tensile properties of the composition, because the tensile modulus is governed by the volume fraction of the filler additive, the strength of the composition is not impacted in the same manner. The overall strength of the composition is instead influenced by the physical size and shape of the filler that is selected, the dispersion of the filler and the wetting out of the filler by the polymer matrix. If the selected filler does not have a high aspect ratio and a good wet out by the polymer matrix during compounding, the strength of the filler does not necessarily translate into an increase in the strength of the composition. Accordingly, a composition that has a high volume loading of fillers will have the benefit of increased thermal conductivity and stiffness but only a small increase (or often a decrease) in tensile strength, thereby producing a material with a low elongation to break ratio. In other words, a very brittle composition. Below are two examples illustrating the properties of the individual materials in the composition as compared to the resultant material properties of the composition itself:

EXAMPLE 1

Ceramic Filler

|  | Strength | Modulus | % Elongation to Break |
| --- | --- | --- | --- |
| Base Polymer | 86 mPa | 4.0 GPa | 5% |
| Ceramic Filler | 300 mPa | 370 GPa | undetectable |
| Composition | 58 mPa | 23 GPa | 0.3 |
| % Change | −30% | +575% | −94% |

EXAMPLE 2

Carbon Filler

|  | Strength | Modulus | % Elongation to Break |
| --- | --- | --- | --- |
| Base Polymer | 86 mPa | 4.0 GPa | 5% |
| Carbon Filler | 100 mPa | 60 GPa | undetectable |
| Composition | 42 mPa | 21 GPa | 0.3 |
| % Change | −50% | +525% | −94% |

As can be seen in these examples, there is a large increase in stiffness of the overall composition that is on the order of 500% that is accompanied by a significant reduction in strength and elongation.

While it is possible to compound thermally conductive polymer compositions that include higher mechanical properties than those listed above by varying the form of the filler used, the only improvement seen is in the strength of the composition with no decrease in the stiffness of the finished product. Further, when changing the form of the material, by replacing a powder with a fiber for example, the cost associated with the processing is generally increased thereby placing practical limits on the cost effectiveness and utility of such compositions.

Accordingly, a compromise has typically been required wherein the flexibility of the composition has been sacrificed by allowing the stiffness to be dramatically increased when the composition was required for use in high thermal conductivity applications and conversely, the thermal conductivity of the composition has been limited in applications where the composition required improved structural properties. The result is a large gap in available thermally conductive thermoplastics with a thermal conductivity value of above 1.5 W/m° K that also have tensile stiffness properties in the range between about 1,700 mPa and about 12,000 mPa. The gap described above is particularly apparent when examining the list of commercially available thermally conductive thermoplastics provided in the tables below:

TABLE 1

Thermal Conductivity below 1.5 W/m°K

| Thermal Cond. (W/mK) | Tensile Modulus (Mpa) | % Elongation | Vendor/Resin |
|---|---|---|---|
| 0.50 | 9,590 | 2.5 | LNP PA6 |
| 0.50 | 7,600 | 3.0 | RTP PA6 (40% mineral) |
| 0.50 | 11,700 | 2.5 | RTP PA66(30% glass/aramid/PTFE) |
| 0.52 | 10,500 | 2.1 | Quadrant PAI (30% graphite fiber) |
| 0.53 | 16,500 | 2.5 | RTP PA66 (50% glass/heat stable) |
| 0.55 | 24,800 | 1.5 | RTP ABS (40% carbon fiber) |
| 0.60 | (80 Shore D) presumed below | 5.0 | Cotronics |
| 0.63 | (60 Shore A) presumed below | 50.0 | GE Silicones (silicone) |
| 0.65 | 22,000 | 0.7 | ChevronPhillips PPS (glass/mineral) |
| 0.70 | 6,600 | 2.5 | RTP PP |
| 0.70 | 5,380 | ? | Devcon (aluminum epoxy) |
| 0.70 | 5,170 | ? | Devcon (aluminum/epoxy) |
| 0.72 | 24,100 | 1.5 | RTP PC (40% carbon) |
| 0.73 | 17,200 | ? | Rogers (glass/epoxy) |
| 0.74 | 19,200 | 0.6 | Plenco (glass/mineral/polyester) |
| 0.75 | (57 ShoreD) below | 230.0 | Solvay PTFE (graphite) |
| 0.77 | 2,200 | 10.0 | Quadrant PTFE (mica filled) |
| 0.79 | 14,500 | 2.5 | PolyOne PSF (30% carbon fiber) |
| 0.80 | 9,700 | 6.0 | Solvay PAI (graphite/fluoropolymer) |
| 0.80 | 6,210 | ? | Devcon (ceramic/epoxy) |
| 0.90 | 15,850 | 1.0 | RTP LCP |
| 0.90 | 4,800 | 2.5 | DuPont Vespel |
| 0.92 | 12,400 | 1.0 | Quadrant PEEK (30% carbon fiber) |
| 0.92 | 13,000 | 1.3 | Ensinger PEEK (30% carbon fiber) |
| 0.92 | 13,000 | 2.0 | Victrex PEEK (30% carbon fiber) |
| 0.92 | 10,300 | ? | Rosite (filled polyester) |
| 0.94 | 11,300 | 1.1 | Plenco (glass/mineral/polyester) |
| 1.00 | 16,300 | 0.8 | LNP PPS |
| 1.00 | 11,300 | 2.2 | LNP PA46 |
| 1.00 | ? | 4.9 | DuPont Vespel |
| 1.00 | (60-80 Shore D) presumed below | 12.0 | Cotronics |
| 1.10 | 10,200 | 2.2 | LNP PA6/12 |
| 1.10 | 8,650 | 0.9 | LNP PP |
| 1.10 | 10,200 | 2.8 | LNP PA6 |
| 1.10 | 5,170 | ? | Devcon (steel/epoxy) |
| 1.15 | 28,300 | 1.5 | RTP PA66 (40% carbon) |
| 1.20 | 14,500 | 0.9 | RTP PPS |
| 1.20 | 11,900 | 1.8 | LNP PA66 |
| 1.20 | 5,000 | 2.9 | CP PA46 (RS306) |
| 1.20 | 8,000 | 1.8 | CP PA46 (D3602) |
| 1.22 | 4,830 | 2.0 | RTP PA6 (40% mineral/FR) |
| 1.30 | 15,800 | 1.0 | RTP PC |
| 1.30 | 14,000 | ? | Cookson (epoxy) |
| 1.30 | 14,000 | ? | Cosmic Plastics (mineral epoxy) |
| 1.33 | 4 | ? | Loctite (silicone) |
| 1.36 | 10,400 | 0.5 | Plenco (graphite/mineral/phenolic) |
| 1.40 | 16,900 | 1.1 | LNP PA46 |
| 1.40 | 4,400 | 1.5 | CP PBT (RS471) |
| 1.40 | 5 | 70.0 | Aptek |

TABLE 2

Thermal Conductivity above 1.5 W/m°K.

| Thermal Cond. (W/mK) | Tensile Modulus (Mpa) | % Elongation | Vendor/Resin |
|---|---|---|---|
| 15.00 | 12 | 46.0 | CP SEBS (RS083) |
| 3.00 | 24 | 143.0 | CP SEBS (RS875) |
| 2.40 | 550 | 21.0 | COPOLYETHER ESTER (RS730) |
| 2.70 | 620 | 8.0 | COPOLYETHER ESTER (RS729) |
| 2.00 | 848 | 1.6 | PolyOne PA12 |
| 3.70 | 9,200 | 0.7 | PolyOne PA6/6 |
| 37.00 | 10,300 | 0.7 | PolyOne PA12 |
| 46.00 | 11,000 | 0.4 | BMC vinyl ester |
| 1.50 | 12,000 | 0.7 | CP PA46 (D3606) |
| 10.00 | 12,000 | 0.4 | CP PC (E4503) |
| 2.40 | 12,300 | 1.4 | DuPont PET (45% mineral/glass) |
| 1.60 | 12,400 | 0.8 | RTP LCP |
| 10.00 | 13,000 | ? | BP Amoco (graphite cloth laminate) |
| 5.00 | 14,500 | 0.8 | PolyOne PA6/6 |
| 12.00 | 14,500 | 0.8 | PolyOne PA6/6 |
| 25.00 | 14,500 | 0.4 | PolyOne PA12 |
| 6.00 | 15,000 | ? | BP Amoco (VCK laminate) |
| 2.90 | 16,000 | 1.3 | CP PEEK (RS502)***** |
| 5.00 | 17,200 | 0.2 | RTP PC |
| 16.00 | 18,200 | 0.4 | PolyOne PA12 |
| 1.70 | 19,300 | 1.0 | RTP PA66 |
| 1.50 | 20,000 | 0.6 | CP PPA (RS587) |
| 7.00 | 21,000 | 0.4 | Sumitomo PPS |
| 10.00 | 22,000 | 0.5 | CP PPS (E5103) |
| 20.00 | 22,000 | 0.3 | CP PPS (E5101) |
| 4.00 | 22,300 | 0.4 | PolyOne LCP |
| 1.50 | 23,000 | 0.3 | CP PPS (D5106) |
| 15.00 | 24,000 | 0.4 | Sumitomo PPS |
| 18.00 | 24,000 | 0.4 | RTP LCP |
| 1.50 | 25,000 | 0.6 | CP LCP (D5502) |
| 4.50 | 26,000 | 0.3 | CP PPS (D5104) |
| 2.30 | 26,200 | 0.4 | RTP PPS |
| 6.00 | 26,300 | 0.5 | PolyOne PES |
| 20.00 | 27,000 | 0.4 | Sumitomo PPS |
| 3.40 | 30,300 | 0.5 | RTP LCP |
| 11.00 | 31,000 | 2.0 | PolyOne PPS |
| 11.00 | 31,500 | 0.8 | PolyOne PEI |
| 3.50 | 35,000 | 0.4 | CP PEI (RS554) |
| 1.60 | 36,000 | ? | Anocast (silica/epoxy) |
| 28.00 | 37,200 | 0.9 | PolyOne LCP |
| 20.00 | 45,000 | 0.2 | CP LCP (E2) |
| 2.20 | 51,800 | 0.3 | LNP PPS |
| 9.00 | 150,000 | ? | BP Amoco (T650-35/epoxy) |
| 9.00 | 170,000 | ? | BP Amoco (T650-42/epoxy) |
| 74.00 | 220,000 | ? | BP Amoco (P55/epoxy) |
| 110.00 | 320,000 | ? | BP Amoco (P75/epoxy) |
| 321.00 | 470,000 | ? | BP Amoco (P100/epoxy) |
| 400.00 | 520,000 | ? | BP Amoco (P120/epoxy) |
| 1.87 | (80 Shore D) presumed below | 2.0 | Cotronics |
| 7.20 | ? | 0.2 | Cotronics (silver/epoxy) |

After reviewing the results provide in Tables 1 and 2 above, it is clear that there are virtually no thermally conductive polymers available that have a thermal conductivity of over 1.5 W/m° K while also having a tensile modulus that makes the material suitable for use where non-brittle materials are indicated. It is of particular note that the missing range of mechanical properties is also the range of mechanical properties that is most commonly targeted by plastics manufacturers and compounders. The tensile modulus range of between about 1,700 mPa and about 12,000 mPa is highly desirable because this range represents material properties that are sufficiently rigid without becoming overly stiff. It is this range that is most commonly bracketed on the low end by unfilled engineering plastics (e.g. nylon, polycarbonate, polybutyleneterephthalate) and on the high end by 40% glass filled engineering plastics. For example, the low end of the modulus range of the invention is 1,700 Mpa and unfilled polypropylene has a tensile modulus of about 1,720 Mpa; unfilled PA6 has a tensile modulus of about 2,760 Mpa;

unfilled polycarbonate has a tensile modulus of about 2,400 Mpa; and unfilled PBT has a tensile modulus of about 2,760 Mpa. Similarly, the high end of the modulus range of the invention is 12,000 Mpa and 40% glass fiber filled polypropylene has a tensile modulus of about 7,600 Mpa; 40% glass fiber filled PA6 has a tensile modulus of about 12,060 Mpa; 40% glass fiber filled polycarbonate has a tensile modulus of about 12,000 Mpa; 40% glass fiber filled PBT has a tensile modulus of about 12,400 Mpa; 40% mineral filled LCP has a tensile modulus of about 12,400 Mpa; and 30% glass fiber filled PPS has a tensile modulus of about 12,400 Mpa.

This range (1,700-12,000 Mpa) has been demonstrated over the many years of use to be the most desirable range for the tensile modulus of engineering thermoplastics. This conclusion is borne out by looking at a large sampling of the commercially available thermoplastic resins and compounds. A summary of the commercially available products is shown in listing below. The number of products represents individual resin grades from various manufacturers listed in a free access database.

Of 12,553 thermoplastic resin products found in the database that list a modulus of elasticity:
  8,328 (66%) fall in the range 1,700-12,000 Mpa
  5,132 (41%) fall in the range 2,700-10,000 Mpa
  2,335 (22%) fall in the range 4,000-9,000 Mpa When limiting the search to specific engineering thermoplastics it is clear that most of commercial engineering thermoplastics fall in the modulus range specified in the invention (80% to 95% based on PA6, PBT and PC). This is presumably because application use has driven material formulation to the most useful modulus range.

Of 1,183 PA6 resins and compounds that list a modulus of elasticity
  947 (80%) fall in the range 1,700-12,000 Mpa (invention range)
  785 (66%) fall in the range 2,700-10,000 Mpa (preferred)
  464 (39%) fall in the range 4,000-9,000 Mpa (more preferred)

Of 621 PBT resins and compounds that list a modulus of elasticity
  562 (90%) fall in the range 1,700-12,000 Mpa
  391 (63%) fall in the range 2,700-10,000 Mpa
  244 (39%) fall in the range 4,000-9,000 Mpa Of 1,367 PC resins and compounds that list a modulus of elasticity
  1,297 (95%) fall in the range 1,700-12,000 Mpa
  554 (41%) fall in the range 2,700-10,000 Mpa
  244 (25%) fall in the range 4,000-9,000 Mpa It is also of great interest that when reviewing the various thermally conductive polymer compositions available as provided in Tables 1 and 2 above, it is clear that virtually none of the available materials have a tensile modulus that falls into this highly desirable range. It is appreciated that there are several compositions that have very low modulus of elasticity and relatively high thermal conductivity properties but these materials are elastomeric in nature having very high elongation properties rendering them pliable and generally unsuitable for the structural polymer applications anticipated by the present invention. Further, while there are three compositions that fall within the tensile modulus range described as being highly desirable, they all possess a relatively low elongation (below 0.8%) rendering them brittle.

There is therefore a need for a thermally conductive polymer composition that has sufficient strength and hardness making it suitable for structural applications, while also maintaining the non-brittle properties of the un-filled base polymer resin. More specifically, there is a need for a thermally conductive polymer composition that has a thermal conductivity of greater than 1.5 W/m° K, while also having a tensile modulus of between 1,700 Mpa and 12,000 Mpa and an elongation to break of between approximately 1.2% and 10%.

BRIEF SUMMARY OF THE INVENTION

In this regard, the present invention provides for a thermally conductive polymer composition that includes a base polymer matrix loaded with fillers that results in a final composition having a thermal conductivity that is greater than 1.5 W/m° K and includes a tensile modulus within an acceptable range, such as between 1,700 to 12,000 Mpa and more preferably between approximately 2,700 to 10,000 Mpa and even more preferably in the range of between approximately 4,000 to 9,000 Mpa. The composition of the present invention is produced by using a base polymer matrix having a tensile modulus of between approximately 30 Mpa and 1200 Mpa, which is in turn loaded with the appropriate filler material to make it thermally conductive. Details of the desired materials and examples of suitable compositions will be fully set forth below in the Detailed Description of the Invention.

It is also desirable that the composition of the present invention have, in addition to a tensile modulus within the identified range, an elongation to break value that is at least above 1.0% and more preferably in the range of about 1.2% to 10%. A composition having an elongation value that falls into this range is in line with the typical elongation values that are found in unfilled engineered thermoplastic resins with tensile modulus values in the target range of the present invention, thus making the composition particularly suitable for structural polymer applications.

In view of the above, a novel polymer composition is provided where base matrix and fillers (reinforcing materials) are selected to ensure that the overall target tensile modulus of the final composition is within the identified performance range. This desired target range is selected so that the final composition is suitable for molding and use in common structural applications without the undesirable brittleness and breaking found in prior art thermally conductive plastic compositions.

It is therefore an object of the present invention to provide a thermally conductive polymer composition that has reduced brittleness as compared to the compositions found in the prior art. It is another object of the present invention to provide a polymer composition that has a thermal conductivity of greater than 1.5 W/m° K and a tensile modulus of between 1,700 to 12,000 Mpa and more preferably between approximately 2,700 to 10,000 Mpa and even more preferably in the range of between approximately 4,000 to 9,000 Mpa. It is yet a further object of the present invention to provide a thermally conductive thermoplastic composition that is loaded with thermally conductive fillers to produce a thermal conductivity of greater than 1.5 W/m° K, a tensile modulus of between 1,700 to 12,000 Mpa and more preferably between approximately 2,700 to 10,000 Mpa and even more preferably in the range of between approximately 4,000 to 9,000 Mpa and a percentage elongation to break of between approximately 1.0% and 10%. It is still a further object of the present invention to provide a thermally conductive thermoplastic composition that has a thermal conductivity of greater than 1.5 W/m° K, a tensile modulus of between approximately 4,000 to 9,000 Mpa and percentage elongation to break of between approximately 1.2% and 10%

These together with other objects of the invention, along with various features of novelty, which characterize the invention, are pointed out with particularity in the claims annexed hereto and forming a part of this disclosure. For a better understanding of the invention, its operating advantages and the specific objects attained by its uses, reference should be had to the accompanying descriptive matter in which there is illustrated a preferred embodiment of the invention.

DETAILED DESCRIPTION OF THE INVENTION

Referring back to Tables 1 and 2 above, it is clear that when one examines the current commercially available offerings in thermally conductive thermoplastics, a limited number if these materials have a thermal conductivity of greater than 1.5 W/m° K and of those, none of the available compositions have a tensile modulus in the range of between 1,700 Mpa and 8,500 Mpa. Only a few of the compositions have a tensile modulus that falls in the range of 1,700 Mpa to 12,000 Mpa and these all represent materials with only modest improvements in thermal conductivity having thermal conductivity values that are generally less than 1.5 W/m° K.

It should be noted that the selected thermal conductivity value of greater than 1.5 W/m° K is not arbitrary as the selected value in fact represents a transitional value between materials that are generally considered thermal insulators as compared to those that are generally considered thermal conductors. While generally, thermal conductivity is a continuum that has no discontinuities in the transition between insulator and conductor, the value of 1.5 ° K has generally been set out as a demarcation line wherein materials with conductivities above about 1.5 W/m° K are generally considered conductors (e.g. ice, mercury, stainless steel, alumina, brass, aluminum, copper) and materials with conductivities below 1.5 W/m° K are generally considered insulators (e.g. glass, concrete, brick, wood, air).

Further, while historically there have been molded thermoplastics that have thermal conductivities approaching 1.5 W/m° K that were not intentionally modified to improve thermal conductivity (e.g. carbon fiber filled plastics, graphite filled plastics), these particular materials simply do not provide sufficient thermal conductivity for the applications anticipated by the present invention. Therefore, in the context of thermally conductive polymer compositions, a conductivity of about 1.5 W/m° K is typically selected as a demarcation in the level of thermal conductivity typically achievable from historical technology. The present invention is directed towards providing a composition that has a higher thermal conductivity than the 1.5 W/m° K that was previously achieved in the prior art, while maintaining a good balance of mechanical properties.

The present invention is directed to a thermally conductive polymer composition consisting of a base polymer that is loaded with at thermally conductive filler material wherein the resultant composition has a tensile modulus in the range of between 1,700 Mpa and 12,000 Mpa. Only a few of the compositions have a tensile modulus that falls in the range of between 1,700 to 12,000 Mpa and more preferably between approximately 2,700 to 10,000 Mpa and even more preferably in the range of between approximately 4,000 to 9,000 Mpa, while also having an elongation to break that is between 1.0% and 10% and a thermal conductivity of greater than 1.5 W/m° K.

The composition is formed by providing a base polymer resin and mixing a thermally conductive filler therein such that the thermally conductive filler is uniformly dispersed throughout the polymer resin to form a homogenous thermally conductive polymer composition. The addition of the filler serves to impart thermal conductive properties to the otherwise isolative polymer base material. To produce a composition having the desired resultant mechanical properties, the present invention utilizes a starting polymer base matrix that has a native tensile modulus in the range of about 30-1200 Mpa. This base polymer is combined with a filler material such as is typically utilized to imparting thermal conductivity (e.g. metal, ceramic, carbon) such that the combination, when tailored properly in accordance with the teachings of the present invention falls into the desirable tensile modulus range for the compounded product. The exact tensile modulus of the base polymer material is fully dependent on the type of thermally conductive filler, the volume percentage of filer loading, the target thermal conductivity of the composition and the target tensile modulus, within the invention range, of the final compound.

There are a large number of commercially available materials the meet the required tensile modulus range for the base polymer matrix material as set forth above. Most of the suitable base polymer materials are considered thermoplastic elastomers. In selecting the base polymer material, in addition to selecting a material that has a tensile modulus in the desired range it is also preferable to utilize a thermoplastic elastomer material that has a melt temperature at the higher end of the available range in order to maximize the ultimate temperature stability of the resultant composition. It should be noted the use of a higher melt temperature base polymer is necessary because since the composition is intended for thermal conductivity applications it is anticipated that the finished composition will operate in elevated temperature conditions and must be capable of maintaining its structural properties in such operating conditions. It can be appreciated though that since the composition of the present invention is thermally conductive, the actual operating temperature that the composition is exposed to in an application likely will be substantially reduced as compared to another polymer that has a comparable tensile modulus but is formed as an unfilled, thermally insulative plastic part. This may decrease to some extent the need to maintain the same thermal stability as compared to a similarly thermally insulative polymer component.

Any thermoplastic elastomeric suitable for use as the base polymer of the present invention provided that the starting tensile modulus falls into the identified range provided above and the resultant tensile modulus of the finished composition including the base polymer and the thermally conductive fillers meets the target tensile modulus range for the desired performance of the structural composition. Suitable thermoplastic elastomers include but are not limited to thermoplastic olefin elastomers (TPO), styrenic elastomers, polyurethane elastomers, fluoropolymers, and polyester elastomers. The elastomer may also be any of the range of thermoplastic vulcanizates (TPVs) including TPSiV, Santoprene, etc. More preferably, thermoplastic elastomers that meet the requirements set forth above and further include the desirably high melting temperatures include polyether esters and polyether amides.

In addition to using specific thermoplastic elastomers such as those set forth above to achieve the targeted modulus range, it has been found to be useful to blend a co-polymer base matrix by combining thermoplastic elastomers with stiffer thermoplastic resins that are miscible or compatible or have been compatibilized with the selected base thermoplastic elastomer. This extends the tailorability of the compound modulus and allows a higher temperature (high melting point, higher temperature property retention) compound that still meets the targeted modulus range. An example includes using injection molding grade polybutyleneterephthalate in combination with polyether ester elastomer as the desirable base polymer matrix material. Another example includes using PA6, PA66, PA12, PA46, HTN, PPA or other polyamides in combination with polyether amide elastomers Yet another example includes using polypropylene in combination with thermoplastic olefinic elastomer.

In addition to utilizing the thermoplastic elastomers and co-polymer elastomer blends identified above to provide a base polymer matrix having the desired tensile modulus properties, it is also possible to use low molecular weight version of common thermoplastic resins provided that they have lower stiffness (tensile modulus). Many of these resins are available as additives to improve flow or other properties of thermoplastics. The lower molecular weight materials can be used by themselves or in combination with percentages of the high molecular weight equivalents to meet the desired compound modulus range.

A similar approach to that employed with thermoplastics is useful for thermoset polymers such as may be used as the base polymer matrix in the present invention. A number of thermosetting elastomers can be tailored to impart the proper tensile modulus range for a resultant composition that includes a high loading of thermally conductive fillers. The thermosetting elastomer or resin chemistries that are suitable for use as a base polymer matrix include silicones, urethanes, epoxies, polyesters, fluoropolymers, butadiene and other rubbers, etc. As with the thermoplastics, the thermosetting elastomers can be used alone or in combination with other thermosetting resins or in combination with thermoplastic additives to achieve the proper modulus target.

Suitable non-metallic, thermally-conductive filers for use in the composition of the present invention include, metal oxides such as alumina, magnesium oxide, zinc oxide, and titanium oxide; ceramics such as silicon nitride, aluminum nitride, boron nitride, boron carbide, and carbon materials such as carbon black or graphite. In addition metallic fillers such as aluminum, copper, stainless steel, etc. may also be utilized. It can be further appreciated that mixtures of any of the above listed fillers are also suitable. Generally, the thermally-conductive fillers comprise about 20 to about 80% by weight of the total composition and more particularly about 30 to about 60% by weight of the composition although the actual loading ratios is determined based on the desired tensile modulus and thermal conductivity of the finished composition.

The thermally conductive filler material can be in the form of particles, granular powder, whiskers, fibers, or any other suitable form. The particles or granules can have a variety of structures and a broad particle size distribution. For example, the particles or granules can have flake, plate, rice, strand, hexagonal, or spherical-like shapes with a particle size in the range of 0.1 to less than 1000 microns. In some instances, the thermally conductive material can have a relatively high aspect (length to thickness) ratio of about 10:1 or greater. For example, PITCH-based carbon fiber having an aspect ratio of about 50:1 can be used. Alternatively, the thermally conductive material can have a relatively low aspect ratio of about 5:1 or less. For example, boron nitride grains having an aspect ratio of about 4:1 can be used. Both low aspect and high aspect ratio materials can be added to the polymer matrix as described in McCullough, U.S. Pat. No. 6,048,919, the disclosure of which is hereby incorporated by reference. Particularly, the compositions of this invention can contain about 25 to about 60% by weight of a thermally conductive material having a high aspect ratio of about 10:1 or greater, and about 10 to about 25% by weight of a thermally conductive material having a low aspect ratio of about 5:1 or less.

Further, an optional reinforcing material can be added to the polymer matrix. The reinforcing material can be glass, inorganic minerals, or other suitable material. The reinforcing material, if added, constitutes about 3% to about 25% by weight of the composition.

The thermally-conductive material and optional reinforcing material are intimately mixed with the non-conductive polymer matrix to form the polymer composition. If desired, the mixture may contain other additives such as, for example, flame retardants, antioxidants, plasticizers, dispersing aids, and mold-releasing agents. Preferably, such additives are biologically inert. The mixture can be prepared using techniques known in the art. Listed below are several examples that provide thermally conductive polymer composition that fall within the operative range of the present invention:

| Base Resin | Filler Loading | Thermal Conductivity (W/m°k) | Tensile Modulus (Mpa) | Percent Elongation |
|---|---|---|---|---|
| copolyether ester (COPE) (RS745) | 30% | 2.2 | 4,400 | 4.7 |
| copolyether ester (COPE) (RS746) | 30% | 2.6 | 6,000 | 1.5 |
| Polypropylene (RS032) | 50% | 10 | 7,100 | 1.5 |
| copolyether ester (COPE) (RS740) | 45% | 14 | 3,430 | 3.1 |

It can therefore be seen that the present invention provides a highly thermally conductive polymer composition that is suitable for use in structural polymer applications. Further, the present invention provides a thermally conductive polymer composition that has greatly reduced stiffness and a desireable tensile modulus that provides for a reduction in brittleness as compared to the thermally conductive composition that are known in the prior art. For these reasons, the present invention is believed to represent a significant advancement in the art, which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A thermally conductive polymer composition having reduced brittleness comprising:
   about 40% to about 70% base thermoplastic elastomer matrix having a tensile modulus in the range of between 30 Mpa and 1200 Mpa; and
   about 30% to about 60% thermally conductive filler uniformly dispersed throughout said base matrix,
   wherein said thermally conductive polymer composition has a thermal conductivity of as least 1.5 w/m° K, and is a structural composition having a tensile modulus of between 4,000 Mpa and 9,000 Mpa and an elongation to break that is between 1.2% and 10%.

2. The thermally conductive polymer composition of claim 1, wherein said thermoplastic elastomer is selected from the group consisting of: polyether esters and polyether amides.

3. The thermally conductive polymer composition of claim 1, wherein said thermoplastic elastomer is selected from the group consisting of: thermoplastic olefin elastomers (TPO), styrenic elastomers, polyurethane elastomers, fluoropolymers, polyester elastomers and thermoplastic vulcanizates (TPVs).

4. A thermally conductive polymer composition having reduced brittleness comprising:
   about 40% to about 70% base thermoplastic co-poylmer including a thermoplastic elastomer and a thermoplastic;
   about 30% to about 60% thermally conductive filler uniformly dispersed throughout said base matrix,
   wherein said thermally conductive polymer composition has a thermal conductivity of as least 1.5 w/m° K, and is a structural composition having a tensile modulus of between 4,000 Mpa and 9,000 Mpa and an elongation to break that is between 1.2% and 10%.

5. The thermally conductive polymer composition of claim 4, wherein said thermoplastic co-polymer is selected from the group consisting of: polybutyleneterephthalate in combination with polyether ester elastomer, polyamide in combination with polyether amide elastomer and polypropylene in combination with thermoplastic olefinic elastomer.

6. A method of forming a thermally conductive polymer composition having reduced brittleness comprising the steps of:
   providing about 40% to about 70% base matrix of thermoplastic co-poylmer including a thermoplastic elastomer and a thermoplastic polymer having a tensile modulus in the range of between 30 Mpa and 1200 Mpa;
   providing about 30% to about 60% thermally conductive filler; and
   mixing said thermally conductive filler uniformly throughout said base matrix, wherein said thermally conductive polymer composition has a thermal conductivity of as least 1.5 w/m° K, a tensile modulus of between 4,000 Mpa and 9,000 Mpa and an elongation to break that is between 1.0% and 10%.

7. The method of forming a thermally conductive polymer composition of claim 6, wherein said thermoplastic co-polymer is selected from the group consisting of: polybutyleneterephthalate in combination with polyether ester elastomer, polyamide in combination with polyether amide elastomer and polypropylene in combination with thermoplastic olefinic elastomer.

* * * * *